United States Patent
Fujita (10) Patent No.: US 8,018,554 B2
(45) Date of Patent: Sep. 13, 2011

(54) LIQUID CRYSTAL DISPLAY DEVICE WITH INTERNAL RETARDATION LAYER AT REFLECTION REGION AND ELECTRONIC APPARATUS

(75) Inventor: Shin Fujita, Suwa (JP)

(73) Assignee: Sony Corporation, Tokyo (JP)

( * ) Notice: Subject to any disclaimer, the term of this patent is extended or adjusted under 35 U.S.C. 154(b) by 768 days.

(21) Appl. No.: 12/003,048

(22) Filed: Dec. 19, 2007

(65) Prior Publication Data

US 2008/0239220 A1    Oct. 2, 2008

(30) Foreign Application Priority Data

Mar. 28, 2007 (JP) ................................. 2007-083648
Aug. 17, 2007 (JP) ................................. 2007-212630

(51) Int. Cl.
*G02F 1/1335* (2006.01)
(52) U.S. Cl. ........ 349/114; 349/117; 349/118; 349/119; 349/120; 349/121
(58) Field of Classification Search .......... 349/117–121, 349/114
See application file for complete search history.

(56) References Cited

U.S. PATENT DOCUMENTS

| | | | |
|---|---|---|---|
| 6,485,997 B2 | 11/2002 | Lee et al. | |
| 6,630,973 B1 * | 10/2003 | Matsuoka et al. | ............ 349/117 |
| 6,646,707 B2 | 11/2003 | Noh et al. | |
| 7,088,409 B2 | 8/2006 | Itou et al. | |
| 7,126,657 B2 | 10/2006 | Okumura | |
| 7,446,836 B2 | 11/2008 | Kurashima | |
| 7,812,905 B2 * | 10/2010 | Sekiguchi et al. | ............ 349/114 |
| 2004/0004681 A1 | 1/2004 | Ozawa et al. | |
| 2006/0001804 A1 | 1/2006 | Doornkamp | |
| 2006/0061716 A1 | 3/2006 | Yamaguchi et al. | |
| 2006/0290872 A1 | 12/2006 | Morii et al. | |
| 2007/0013773 A1 | 1/2007 | Tsuchiya et al. | |
| 2007/0171319 A1 | 7/2007 | Fujita et al. | |
| 2007/0263148 A1 * | 11/2007 | Teramoto et al. | ............. 349/117 |

FOREIGN PATENT DOCUMENTS

| | | |
|---|---|---|
| JP | A 2001-235763 | 8/2001 |
| JP | A 2002-182230 | 6/2002 |
| JP | A-2002-350885 | 12/2002 |
| JP | A 2004-151202 | 5/2004 |
| JP | A 2004-279566 | 10/2004 |
| JP | A 2005-338256 | 12/2005 |
| JP | A-2006-091059 | 4/2006 |
| JP | A-2006-154599 | 6/2006 |
| JP | A 2007-003779 | 1/2007 |
| JP | A-2007-047732 | 2/2007 |

* cited by examiner

*Primary Examiner* — Hoan C Nguyen
(74) *Attorney, Agent, or Firm* — K&L Gates LLP (57) ABSTRACT

A liquid crystal device, in which a liquid crystal layer is held between a pair of substrates, includes a plurality of pixels and a retardation layer. Each of the plurality of pixels includes a transmissive display area and a reflective display area. The retardation layer is arranged at a position that at least overlaps the reflective display areas and on an inner surface side of the pair of substrates. The retardation layer is formed so as to extend over the reflective display areas of at least two adjacent pixels among the plurality of pixels. The retardation layer has a first end portion and a second end portion. The first end portion is located on one of the two adjacent pixels. The second end portion is opposite the first end portion and located on the other pixel of the two adjacent pixels.

13 Claims, 8 Drawing Sheets

PRIOR ART

FIG. 6B

LIQUID CRYSTAL DISPLAY DEVICE WITH INTERNAL RETARDATION LAYER AT REFLECTION REGION AND ELECTRONIC APPARATUS

BACKGROUND

1. Technical Field

The present invention relates to a liquid crystal device and an electronic apparatus that is provided with the liquid crystal device and, more particularly, to a liquid crystal device that has a retardation layer formed on an inner surface side of a liquid crystal panel.

2. Related Art

In order to achieve a wide viewing angle of a liquid crystal display device, a liquid crystal display device that drives liquid crystal using an electric field, such as a so-called fringe field switching (hereinafter, referred to as FFS) mode display device or a so-called in-plane switching (hereinafter, IPS) mode display device, has been practically used. In addition, among the above liquid crystal display devices, liquid crystal display devices, in which a plurality of pixels each have a transmissive display area and a reflective display area, have been proposed. Furthermore, in order to eliminate a difference in retardation due to a difference in length of path, along which light travels, between a transmission mode and a reflection mode while minimizing an influence of viewing angle dependency of a retardation film, Japanese Unexamined Patent Application Publication No. 2005-338256 describes that a retardation layer formed of liquid crystal polymer is provided on a surface of the substrate, on which the liquid crystal layer is arranged.

Figure 6A:
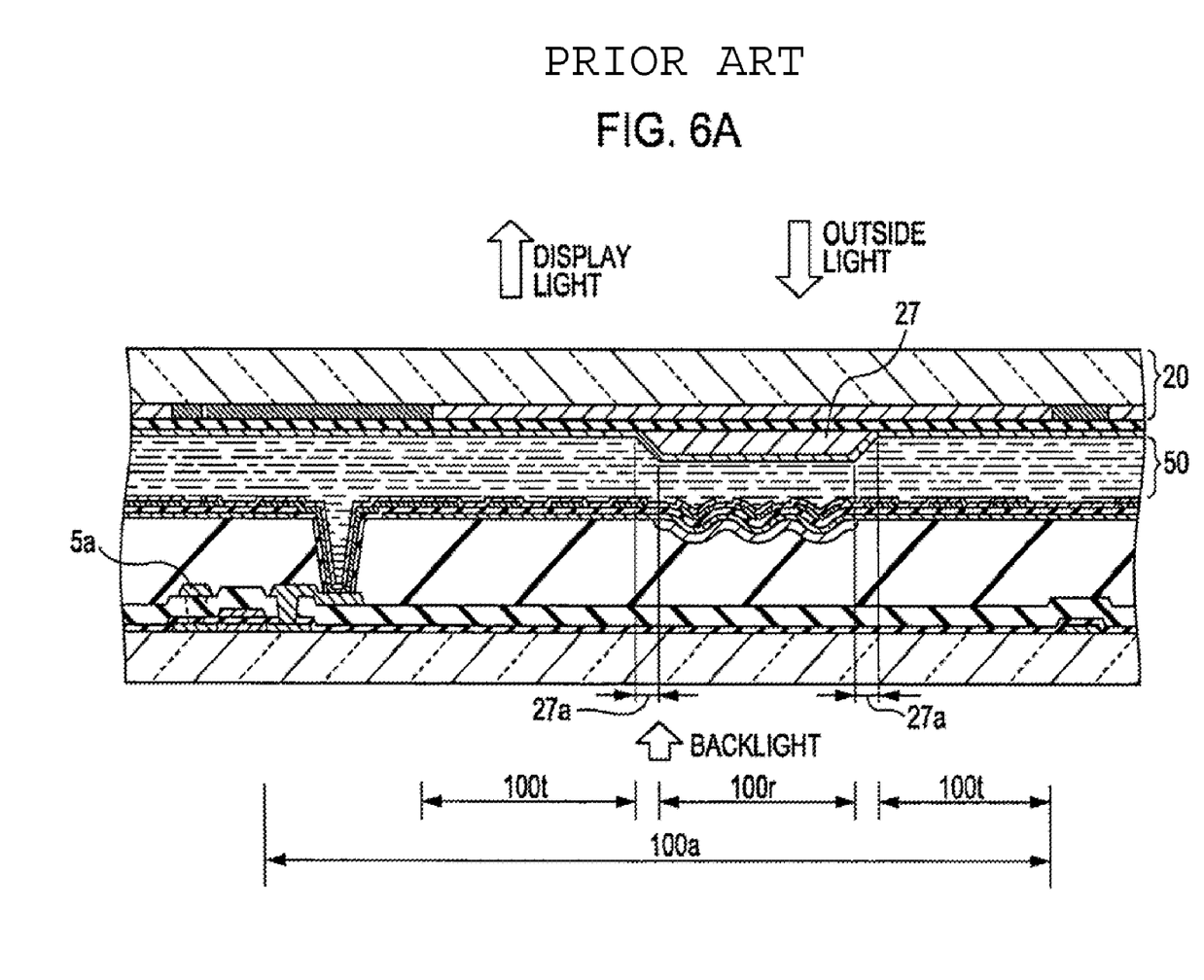
FIG. 6A is a cross-sectional view of one pixel of a liquid crystal display device, taken along the line VIA-VIA in FIG. 6B, according to a known art.
Figure 6B:
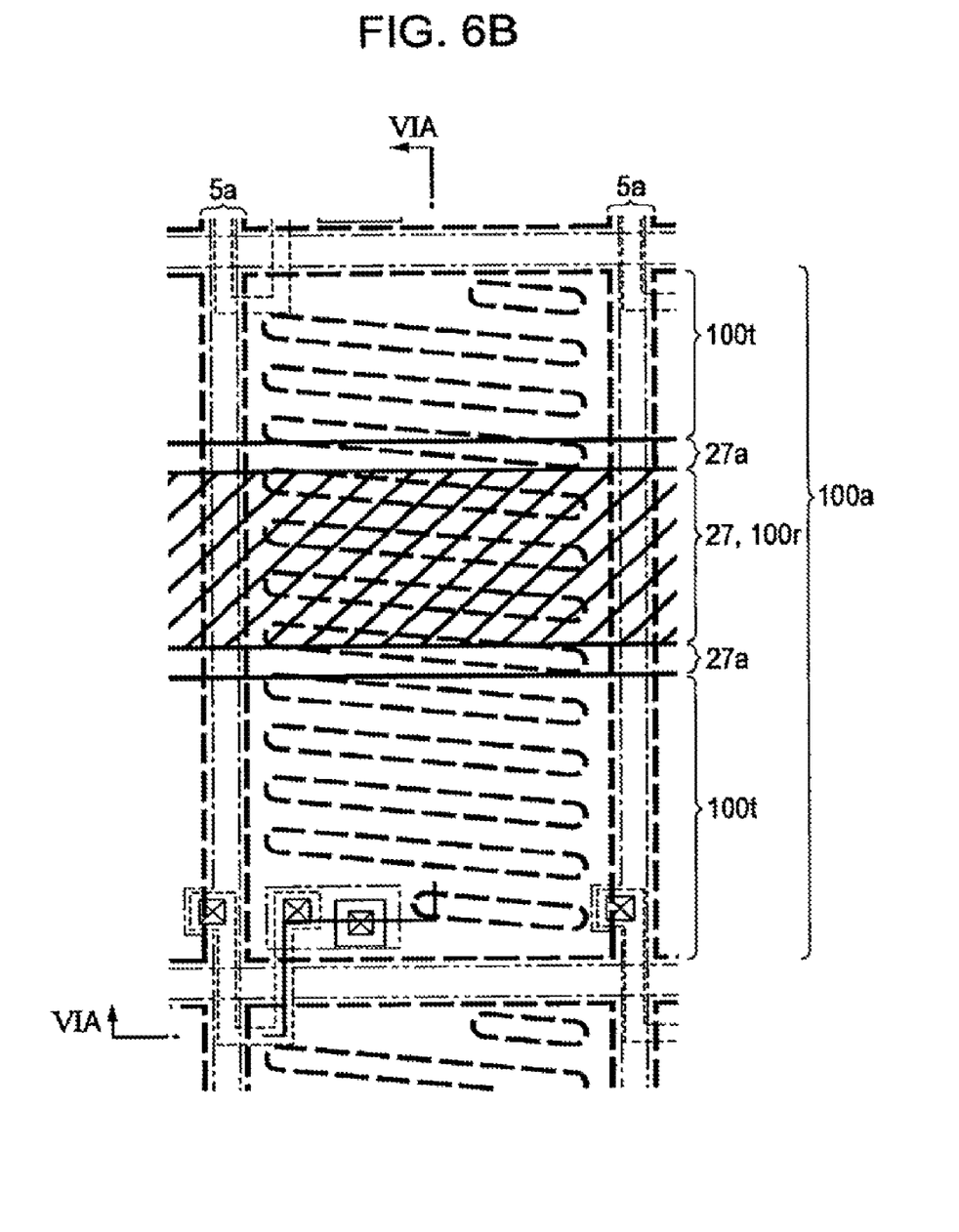
FIG. 6B is a plan view of the adjacent pixels in the element substrate according to the known art.

However, because the retardation layer, which is different from a sheet-like retardation film, is formed by applying liquid crystal polymer on a substrate surface, or the like, a wide tapered portion appears at an end portion, and thereby light that exits by being transmitted through the tapered portion is not appropriately modulated. For example, as shown in FIG. 6A, which is a cross-sectional view of an FFS mode liquid crystal display device according to a reference example, and FIG. 6B, which is a plan view of the FFS mode liquid crystal display device, a plurality of pixels 100a each have a transmissive display area 1oot and a reflective display area 100r. When the reflective display area 100r is set at a substantially center area of each pixel 100a, a retardation layer 27 (area indicated by upward oblique lines in FIG. 6B) is formed on the surface of the opposite substrate 20, adjacent to the liquid crystal layer 50 at the center area of the pixel 100a. As a result, in the retardation layer 27, wide tapered portions 27a appear at both end portions in a direction in which a data line 5a extends. In the tapered portions 27a, because the thickness of the liquid crystal layer is uneven and the phase difference of the retardation layer 27 is not constant, the tapered portions 27a do not contribute to image display and also cause a decrease in contrast.

SUMMARY

An advantage of some aspects of the invention is that it provides a liquid crystal display device in which, when pixels each include a transmissive display area and a reflective display area having a retardation layer, a decrease in image quality due to a tapered portion of the retardation layer can be suppressed in the pixels, and that it also provides an electronic apparatus provided with the liquid crystal display device.

A first aspect of the invention provides a liquid crystal device. The liquid crystal device, in which a liquid crystal layer is held between a pair of substrates, includes a plurality of pixels and a retardation layer. Each of the plurality of pixels includes a transmissive display area and a reflective display area. The retardation layer is arranged at a position that at least overlaps the reflective display areas and on an inner surface side of the pair of substrates. The retardation layer is formed so as to extend over the reflective display areas of at least two adjacent pixels among the plurality of pixels. The retardation layer has a first end portion and a second end portion. The first end portion is located on one of the two adjacent pixels. The second end portion is opposite the first end portion and located on the other pixel of the two adjacent pixels. The retardation layer may have an end portion that is tapered. In addition, the reflective display areas of the two adjacent pixels may be opposite each other and located on both sides of a pixel boundary area that extends in a first direction. Moreover, the plurality of pixels may include a plurality of pixels that are arranged along the first direction, and the retardation layer may extend over the plurality of pixels that are arranged along the first direction. Furthermore, the pixels may include pixel electrodes, switching elements that are connected to the corresponding pixel electrode, and at least one common electrode that is opposite the pixel electrodes, wherein each of the switching elements is connected to a corresponding scanning line and a corresponding signal line, and wherein one of the scanning line and the signal line is formed in the pixel boundary area that extends in the first direction.

In the liquid crystal device according to the first aspect, the retardation layer is formed so as to extend over the reflective display areas of at least two adjacent pixels among the plurality of pixels, the first end portion is located on one of the two adjacent pixels, and the second end portion is opposite the first end portion and located on the other pixel of the two adjacent pixels. Thus, one side of the end portion of the retardation layer is located on each pixel. Thus, even when the end portion of the retardation layer is a tapered portion that decreases display quality, an area in each pixel, occupied by the tapered portion, is extremely small. Thus, it is possible to suppress a decrease in display quality due to the tapered portion of the retardation layer. Even when the end portion of the retardation layer is a step portion without a tapered portion, the aspect of the invention is still effective because defective display occurs at that step portion.

In the liquid crystal device according to the first aspect, the retardation layer may have a third end portion that intersects with the first end portion and/or the second end portion, wherein the third end portion is located outside the plurality of pixels. Then, the plurality of pixels may include display pixels that are arranged in an image display area and dummy pixels that are arranged outside the image display area, wherein the third end portion of the retardation layer is located further outside the dummy pixels.

When the third end portion of the retardation layer is located on a pixel, the first or second end portion of the retardation layer and the third end portion are located on that pixel. As a result, the tapered portion occupies a large area in that pixel. However, in the aspect of the invention, the third end portion of the retardation layer is located outside the plurality of pixels. Thus, according to the aspect of the invention, because an area occupied by the tapered portion in the pixel is small even in the pixels arranged on the outermost side among the plurality of pixels, it is possible to suppress a decrease in display quality due to the tapered portion of the retardation layer.

It is only necessary to arrange the third end portion of the retardation layer outside the display pixels that are arranged in the image display area for obtaining this advantageous effect; however, the above advantageous effect becomes more notable by arranging the dummy pixels outside the display pixels and then arranging the third end portion of the retardation layer further outside the dummy pixels. Because the distance between the third end portion having the tapered portion and the display pixels located at the outermost position is increased, it is possible to remove an influence of defective alignment around the tapered portion. Of course, it is also applicable that the dummy pixels are arranged outside the display pixels, and the third end portion of the retardation layer is located on the dummy pixels.

In the liquid crystal device according to the first aspect, a light shielding area that overlaps the third end portion may be provided. As an example, there is a configuration in which a light shielding area that surrounds the periphery of the image display area in the form of a window frame shape is provided on a substrate adjacent to a viewer and then the end portion of the retardation layer is arranged in the light shielding area, or a configuration in which the third end portion of the retardation layer is covered with a black resin, or the like, having a high optical absorptivity. Of course, it is more effective that these two configurations are combined together, that is, the third end portion of the retardation layer and the window frame-shaped light shielding area are arranged so as to overlap each other in plan view, and the third end portion is configured to be covered with a black resin, or the like. Then, the resin that covers the third end portion is located inside the window frame-shaped light shielding area and is configured not to protrude outside the light shielding area. This is because a window frame of the image display area is prevented from being deformed.

The configuration of the liquid crystal device according to the first aspect may be suitably used in a liquid crystal device, such as a so-called fringe field switching (hereinafter, referred to as FFS) mode display device or an in-plane switching (hereinafter, referred to as IPS) mode display device, in which both the pixel electrodes and the common electrode are formed in one of the pair of substrates and liquid crystal is then driven through a horizontal or oblique electric field formed between the pixel electrodes and the common electrode. The configuration of the liquid crystal device according to the first aspect may be used in another mode display device, such as a TN (twisted nematic) mode display device, a homeotropic alignment mode display device, or an OCB mode display device.

A second aspect of the invention provides a liquid crystal device. The liquid crystal device, in which a liquid crystal layer is held between a pair of substrates, includes a plurality of pixels, a retardation layer that is arranged on an inner surface side of the pair of substrates and at a position that at least overlaps the pixels, wherein the retardation layer is arranged so as to extend over the plurality of pixels and has an end portion that is located outside the plurality of pixels. The configuration of the aspect of the invention is more effective when the end portion of the retardation layer is tapered.

In the liquid crystal device according to the second aspect, the plurality of pixels may include display pixels that are arranged in an image display area and dummy pixels that are arranged outside the image display area, wherein the end portion is located outside the dummy pixels. When the end portion of the retardation layer is located on the pixel, a decrease in display quality occurs due to the tapered end portion of the retardation layer; however, in the liquid crystal device according to the second aspect, the end portion of the retardation layer is located outside the plurality of pixels. Thus, even in the pixels that are located at the end portion within the image display area among the plurality of pixels, it is possible to suppress a decrease in display quality due to the end portion of the retardation layer. It is only necessary to arrange the end portion of the retardation layer outside the display pixels that are arranged in the image display area for obtaining the above advantageous effect; however, the above advantageous effect becomes more notable by arranging the dummy pixels outside the display pixels and then arranging the end portion of the retardation layer further outside the dummy pixels. Because the distance between the end portion having the tapered portion and the display pixels located at the outermost position is increased, it is possible to remove an influence of defective alignment around the tapered portion. Of course, it is also applicable that the dummy pixels are arranged outside the display pixels, and the end portion of the retardation layer is located on the dummy pixels. Even when the end portion of the retardation layer is a step portion without a tapered portion, the aspect of the invention is effective because defective display occurs at that step portion.

In the liquid crystal device according to the second aspect, a light shielding area that overlaps the end portion of the retardation layer may be provided. As an example, there is a configuration in which a light shielding area that surrounds the periphery of the image display area in the form of a window frame shape is provided on a substrate adjacent to a viewer and then the end portion of the retardation layer is arranged in the light shielding area, or a configuration in which the end portion of the retardation layer is covered with a black resin, or the like, having a high optical absorptivity. Of course, it is more effective that these two configurations are combined together, that is, the end portion of the retardation layer and the window frame-shaped light shielding area are arranged so as to overlap each other in plan view, and the end portion is configured to be covered with a light shielding layer formed of a black resin, or the like. In addition, when the light shielding layer, which is formed of a black resin, or the like, is formed to extend partly onto an even portion of the retardation layer over the end portion thereof, it is possible to cover the tapered portion completely with the light shielding layer. The resin that covers the end portion of the retardation layer is located inside the window frame-shaped light shielding area and is configured not to protrude outside the light shielding area. This is because a window frame of the image display area is prevented from being deformed.

Furthermore, the pixels may include pixel electrodes, switching elements that are connected to the corresponding pixel electrodes, and at least one common electrode that is opposite the pixel electrodes, wherein both the pixel electrodes and the common electrode are formed in one of the pair of substrates.

The configuration of the liquid crystal device according to the second aspect may be suitably used in a liquid crystal device, such as a so-called fringe field switching (hereinafter, referred to as FFS) mode display device or an in-plane switching (hereinafter, referred to as IPS) mode display device, in which both the pixel electrodes and the common electrode are formed in one of the pair of substrates and liquid crystal is then driven through a horizontal or oblique electric field formed between the pixel electrodes and the common electrode. The configuration of the liquid crystal device according to the first aspect may be used in another mode display device, such as a TN (twisted nematic) mode display device, a homeotropic alignment mode display device, or an OCB mode display device.

Moreover, the configuration according to the aspect of the invention is applicable to a liquid crystal device in which a retardation layer is formed on an inner surface between the substrates, irrespective of a transmissive type, reflective type, or transflective type display device. In the case of the transflective type display device, in order to make an optical design differently between a reflective display area and a transmissive display area, it is necessary to selectively form a retardation layer in the reflective display area or in the transmissive display area. Therefore, it is highly required to form the retardation layer on the inner surface, so that the transflective type display device is suitable for application of the aspect of the invention.

The above described liquid display device according to the first and second aspects may be used as a display portion of an electronic apparatus, such as a mobile telephone or a mobile computer.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will now be described. Note that in the following description, for easily recognizing the correspondence between the configuration of the embodiment and the configuration shown in FIG. 6A and FIG. 6B, the components having the same function will be described by assigning the same reference numerals. In addition, in the drawings referred in the following description, to make it easier to recognize layers and components shown in the drawings, the scale of the layers and components are varied.

General Configuration

Figures 1A, 1B:
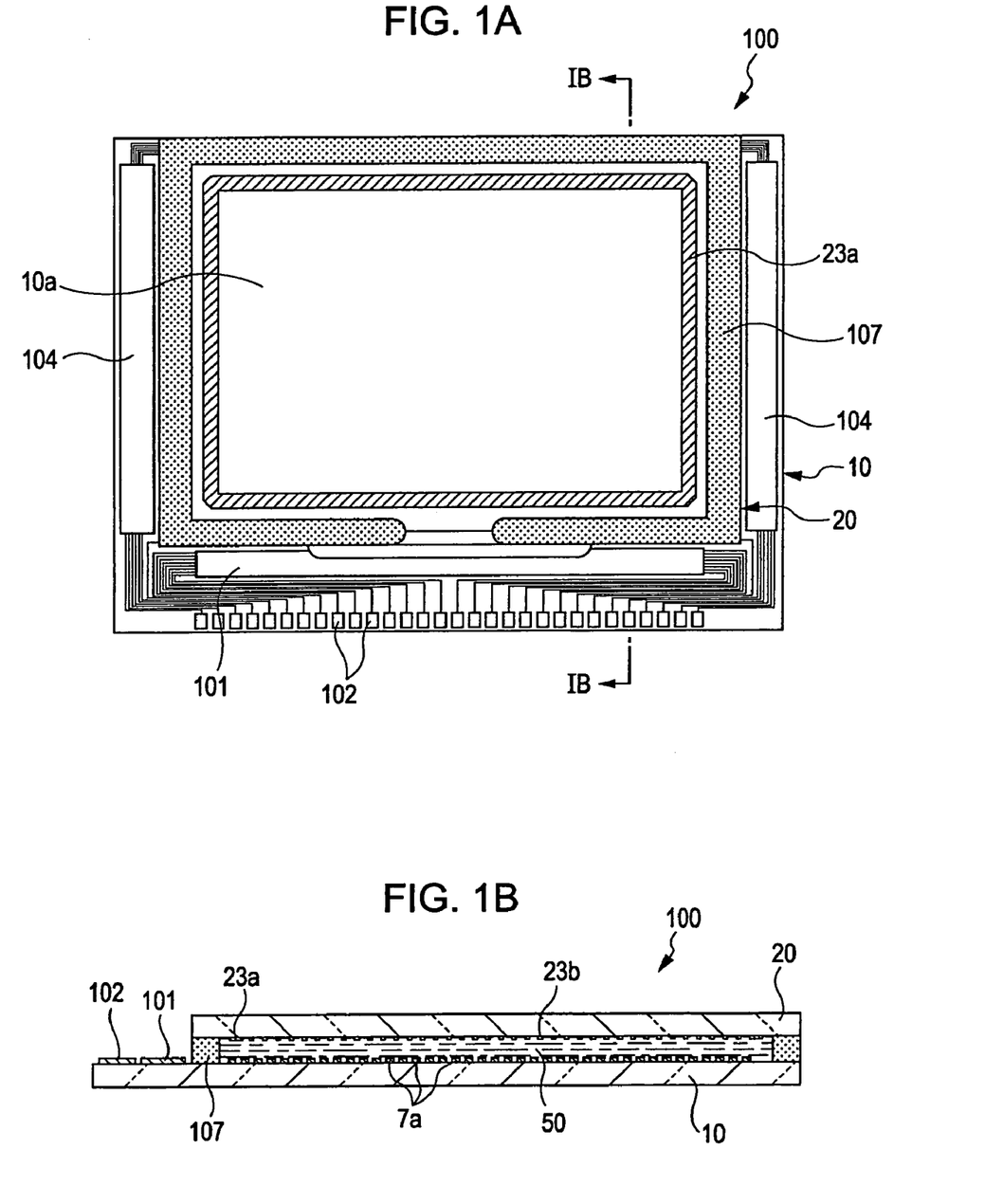
FIG. 1A is a plan view of a liquid crystal display device with components formed therein as viewed from a side of an opposite substrate according to an embodiment of the invention.
FIG. 1B is a cross-sectional view that is taken along the line IB-IB in FIG. 1A.

FIG. 1A is a plan view of a liquid crystal display device with components formed therein as viewed from a side of an opposite substrate according to an embodiment of the invention. FIG. 1B is a cross-sectional view that is taken along the line IB-IB in FIG. 1A.

In FIG. 1A and FIG. 1B, the liquid crystal display device 100 according to the present embodiment is a transflective active matrix liquid crystal display device. A seal material 107 is provided on an element substrate 10 along the periphery of an opposite substrate 20. In the element substrate 10, a data line driving circuit 101 and mounted terminals 102 are provided in an outer area of the seal material 107 along one side of the element substrate 10, and scanning line driving circuits 104 are formed along two sides that are adjacent to the side at which the mounted terminals 102 are arranged. The opposite substrate 20 has substantially the same outline as the seal material 107. By this seal material 107, the opposite substrate 20 is fixed to the element substrate 10. Then, a liquid crystal layer 50 is held between the element substrate 10 and the opposite substrate 20.

Although it will be described in detail later, pixel electrodes 7a are formed in the element substrate 10 in a matrix. In contrast, a window frame-like light shielding area 23a, which is formed of a light shielding material, is formed in an area inside the seal material 107 in the opposite substrate 20, and the inside of the light shielding area 23a forms an image display area 10a. In the opposite substrate 20, a light shielding layer 23b, which is called a black matrix or a black stripe, is formed in an area opposite vertical and horizontal pixel boundary areas of the pixel electrodes 7a of the element substrate 10.

The liquid crystal display device 100 according to the present embodiment drives the liquid crystal layer 50 in an FFS mode. Therefore, in the element substrate 10, a common electrode (not shown in FIG. 1B), which will be described later, is formed in addition to the pixel electrodes 7a, and no opposite electrode is formed in the opposite substrate 20. Note that in the liquid crystal display device 100, a polarizer (not shown) is arranged on the side of the element substrate 10 and another polarizer (not shown) is arranged on the side of the opposite substrate 20, and, furthermore, a backlight device (not shown) is arranged on the side of the element substrate 10.

Detailed Configuration of Liquid Crystal Display Device 100

Figure 2:
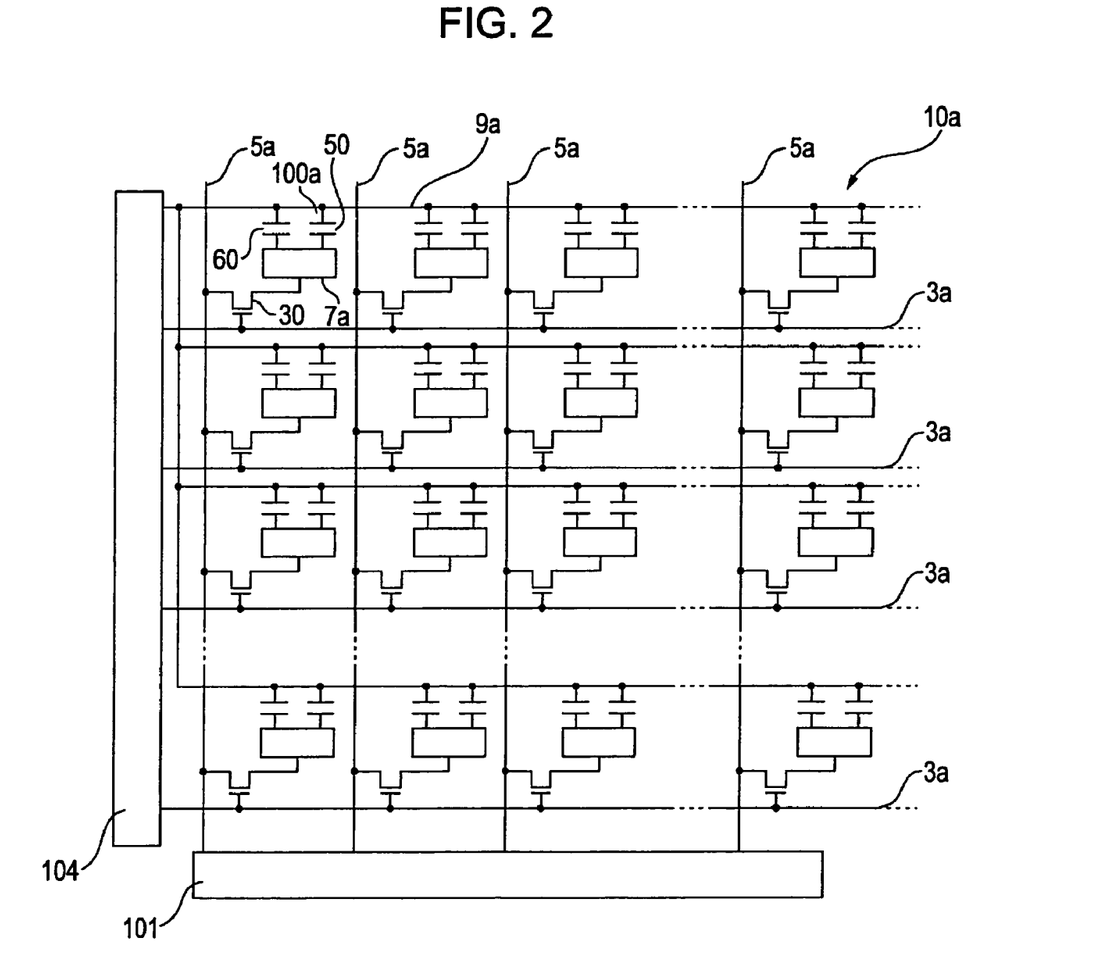
FIG. 2 is an equivalent circuit diagram that illustrates an electrical configuration of an image display area of an element substrate used in the liquid crystal display device according to the embodiment of the invention.

FIG. 2 is an equivalent circuit diagram that illustrates an electrical configuration of the image display area 10a of the element substrate 10 used in the liquid crystal display device 100 according to the embodiment of the invention. As shown in FIG. 2, a plurality of pixels 100a are formed in a matrix in the image display area 10a of the liquid crystal display device 100. Each of the plurality of pixels 100a includes a pixel electrode 7a and a thin-film transistor 30, which serves as a pixel switching element for controlling the pixel electrode 7a. Data lines 5a, which supply data signals (image signals) in line sequential, are electrically connected to the sources of the corresponding thin-film transistors 30. Scanning lines 3a are electrically connected to the gates of the corresponding thin-film transistors 30. The scanning lines 3a are configured to be applied with scanning signals at a predetermined timing in line sequential. Each of the pixel electrodes 7a is electrically connected to the drain of the corresponding thin-film transistor 30. Each pixel electrode 7a writes a data signal, which is supplied from the data line 5a, into the corresponding pixel 100a at a predetermined timing in such a manner that the thin-film transistor 30 is made to enter an on state only during a certain period. In this manner, a pixel signal of a predetermined level, written into the liquid crystal layer 50 shown in FIG. 1B through the pixel electrode 7a, is held with the common electrode 9a, which is formed in the element substrate 10, during a certain period. Here, a holding capacitance 60 is formed between the pixel electrode 7a and the common electrode 9a, and the voltage of the pixel electrode 7a is, for example, held during a period of time that is three digit longer than a period of time during which a source voltage is being applied. Thus, the charge holding characteristic is improved, and it is possible to realize the liquid crystal display device 100 that is able to perform display with high contrast.

In FIG. 2, the common electrode 9a is shown as a wiring extending from the scanning line driving circuit 104; however, the common electrode 9a is formed over the substantially entire surface of the image display area 10a of the element substrate 10 and is held at a predetermined electric potential.

Configuration of Pixel Array Area

Figure 3:
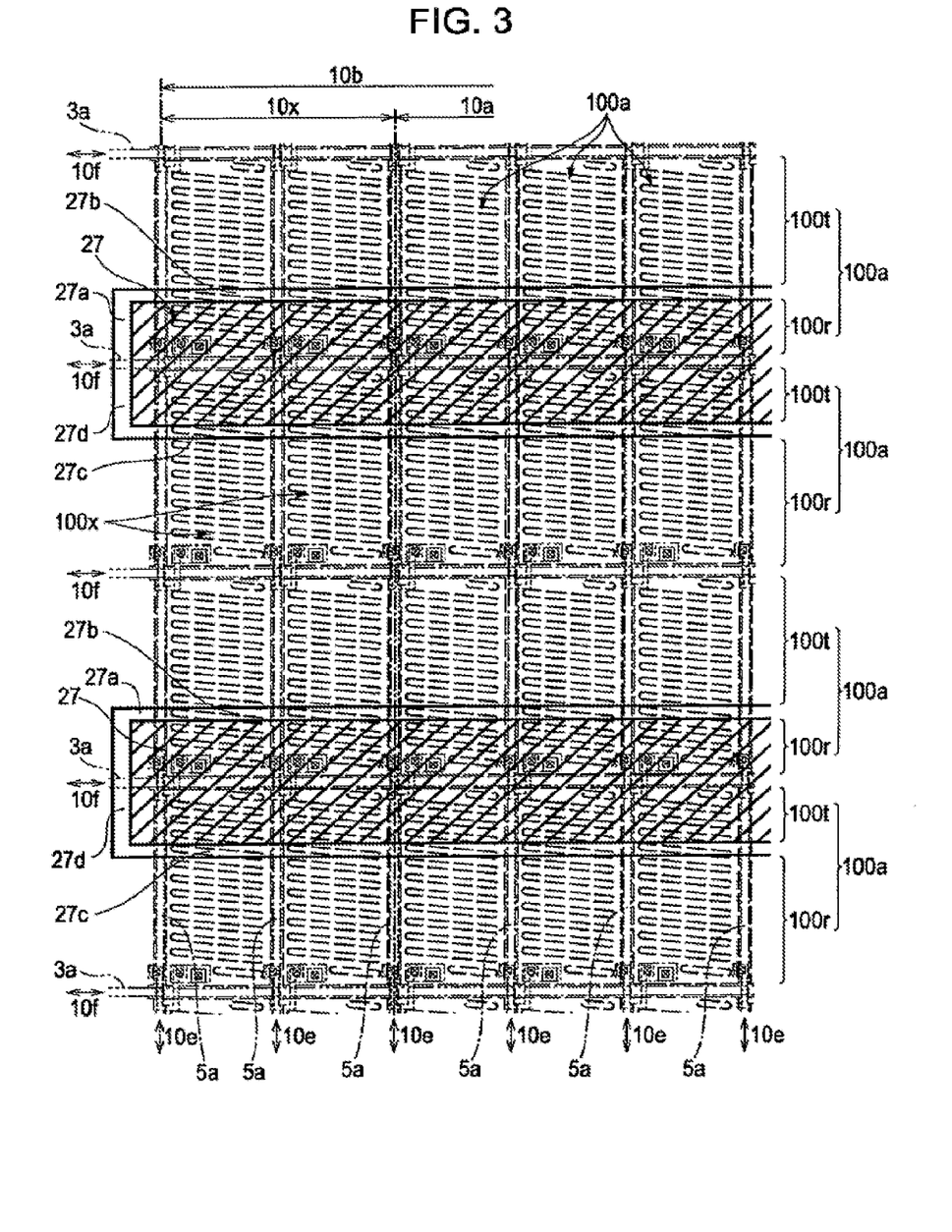
FIG. 3 a view that illustrates a planar configuration of an end portion, adjacent to a scanning line driving circuit, of a pixel array area of the liquid crystal display device according to the embodiment of the invention.

FIG. 3 a view that illustrates a planar configuration of an end portion, adjacent to the scanning line driving circuit 104, of a pixel array area of the liquid crystal display device 100 according to the embodiment of the invention. As shown in FIG. 3, the plurality of pixels 100a are arranged in a matrix in the liquid crystal display device 100, and an area in which these pixels 100a are arranged is a pixel array area 10b. In the pixel array area 10b, the pixels 10a arranged at the end portion are dummy pixels 100x, which are not used for image display. The dummy pixels 100x are covered with the light shielding area 23a (window frame), which has been described with reference to FIG. 1A and FIG. 1B. Thus, the pixel array area 10b from which the dummy pixels 100x are excluded is used as the image display area 10a. An area in which the dummy pixels 100x are formed (dummy pixel area 10x) does not directly contribute to image display.

Configuration of Each Pixel

Figure 4A:
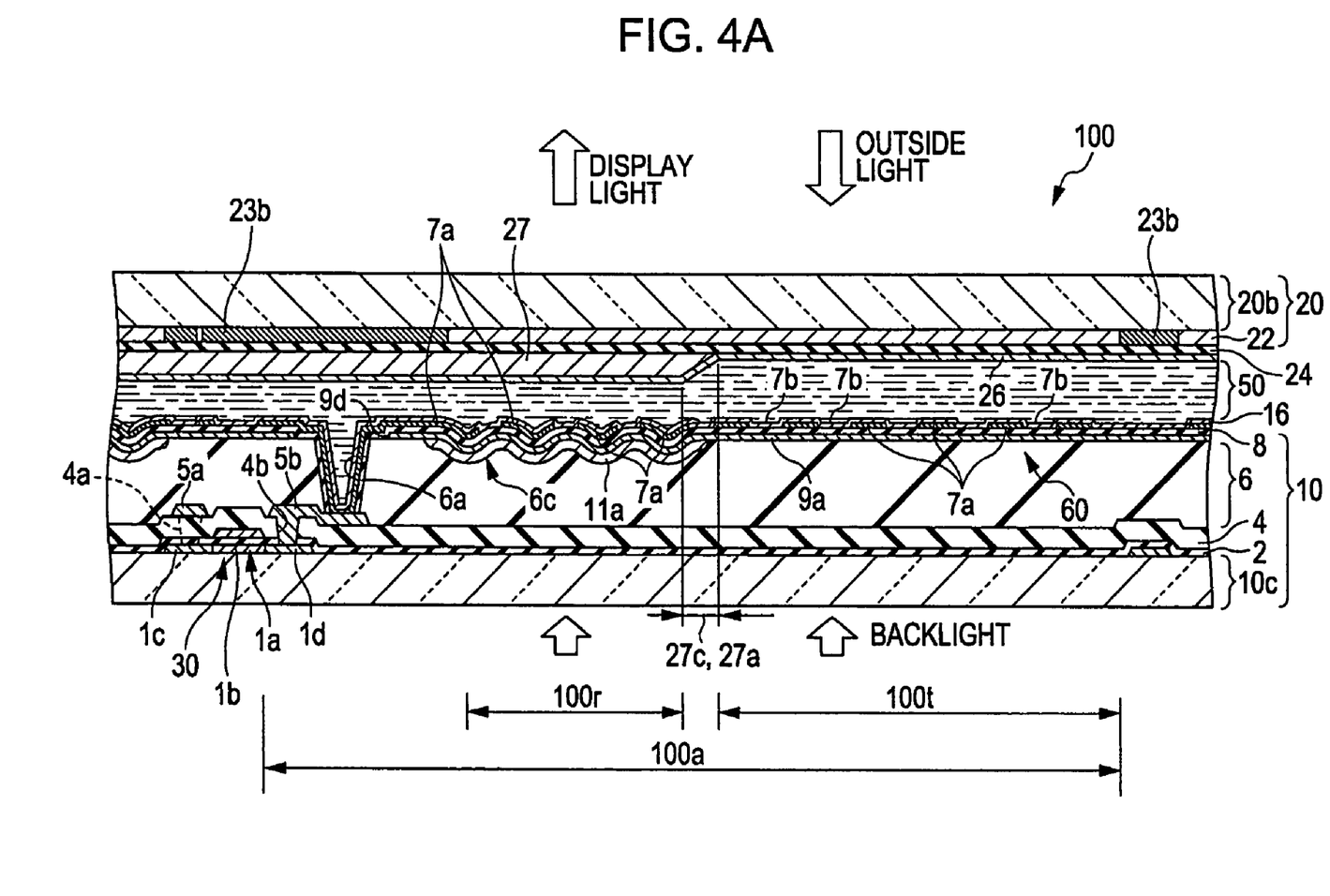
FIG. 4A is a cross-sectional view of one pixel of the liquid crystal display device, taken along the line IVA-IVA in FIG. 4B, according to the embodiment of the invention.
Figure 4B:
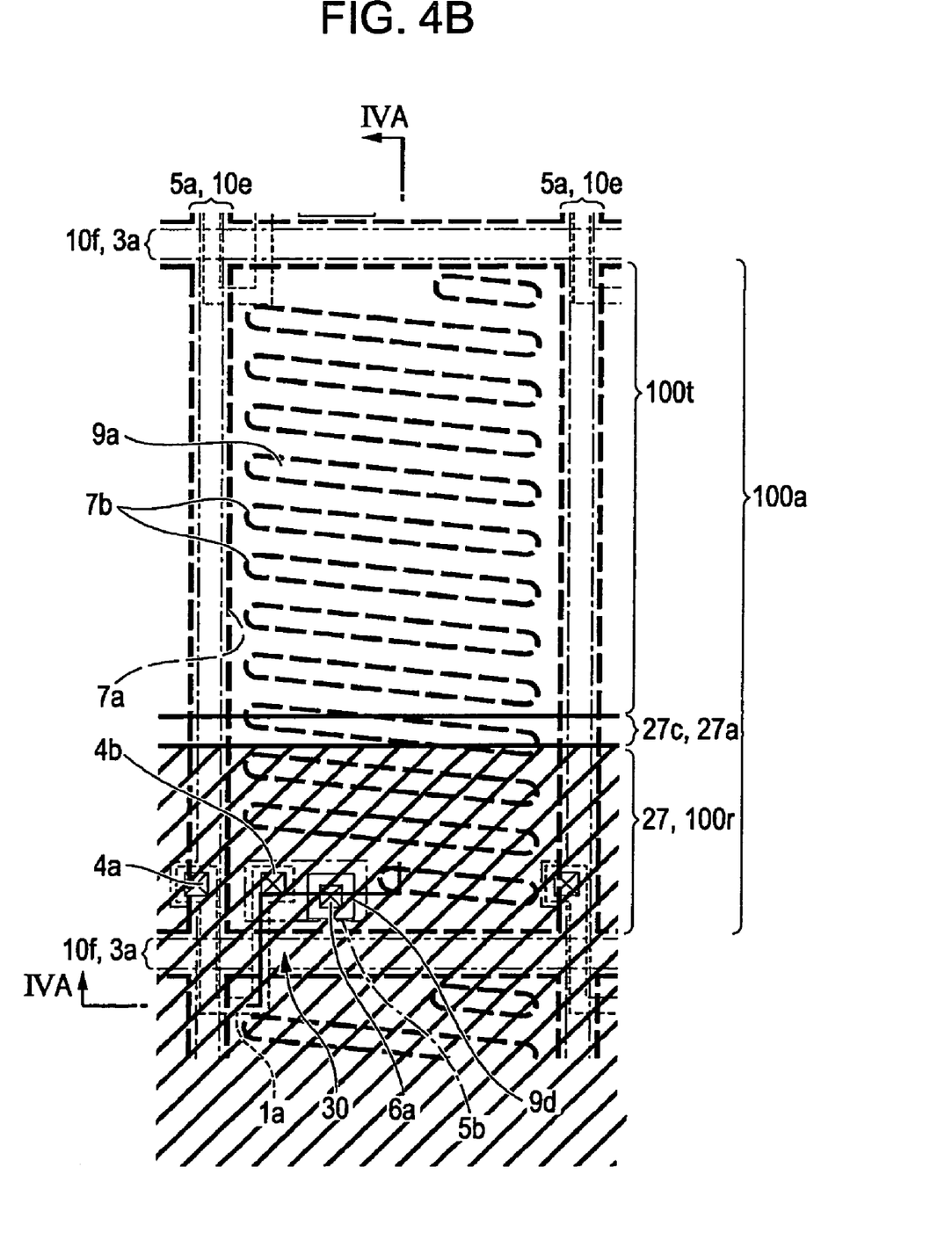
FIG. 4B is a plan view of the adjacent pixels in the element substrate according to the embodiment of the invention.

FIG. 4A is a cross-sectional view of one pixel of the liquid crystal display device 100 according to the embodiment of the invention. FIG. 4B is a plan view of the adjacent pixels in the element substrate 10 according to the embodiment of the invention. FIG. 4A is a cross-sectional view of the liquid crystal display device 100, taken along the line IVA-IVA in FIG. 4B. On the other hand, in FIG. 4B, the pixel electrodes 7a are indicated by a long dotted line, the data lines 5a and the thin-films formed at the same time with the data lines 5a are indicated by an alternate long and short dash line, the scanning lines 3a are indicated by an alternate long and two short dashes line, and a partly removed portion in the common electrode 9a is indicated by a solid line.

As shown in FIG. 4A and FIG. 4B, the plurality of transparent pixel electrodes 7a are formed in a matrix in the element substrate 10 at positions corresponding to the pixels 100a, and the data lines 5a and the scanning lines 3a are respectively formed along the vertical pixel boundary areas 10e and the horizontal pixel boundary areas 10f between the adjacent pixel electrodes 7a. In addition, the common electrode 9a, which is formed of ITO film, is formed over the substantially entire surface of the image display area 10a of the element substrate 10. In the present embodiment, the common electrode 9a is formed solid, while, on the other hand, each of the pixel electrodes 7a includes a plurality of slit-like openings 7b (indicated by a long dotted line) formed therein. In the present embodiment, the plurality of slit-like openings 7b are formed so as to extend obliquely relative to a direction in which the scanning lines 3a extend, and the plurality of slit-like openings 7b extend parallel to each other. Note that each of the slit-like openings 7b may be formed in a shape that bends or curves in midway or may be formed of a group of slits having an inverted oblique direction in which the slits extend.

The base body of the element substrate 10 shown in FIG. 4A is formed of a translucent substrate 10c, such as a quartz substrate or a heat resistant glass substrate. The base body of the opposite substrate 20 shown in FIG. 4A is formed of a translucent substrate 20b, such as a quartz substrate or a heat resistant glass substrate. In the present embodiment, both of the translucent substrates 10c, 20b are formed using a glass substrate.

Referring back to FIG. 4A and FIG. 4B, in the element substrate 10, a base protection film (not shown), which is formed of a silicon oxide film, or the like, is formed on the surface of the translucent substrate 10c, and, on the surface side, top gate type thin-film transistors 30 are formed at positions in proximity to the corresponding pixel electrodes 7a. Each of the thin-film transistors 30 has a structure such that a channel forming region 1b, a source region 1c and a drain region 1d are formed in an island-like semiconductor layer 1a. The thin-film transistor may be formed so as to include an LDD (lightly doped drain) structure in which a lightly doped region is provided on both sides of the cannel forming region 1b. In the present embodiment, the semiconductor layer 1a is a polysilicon film that is polycrystallized by laser annealing, lamp annealing, or the like, after an amorphous silicon film is formed on the element substrate 10.

A gate insulating film 2, which is formed of a silicon oxide film, silicon nitride film, or a laminated film of them, is formed in the upper side layer on the semiconductor layer 1a, and the scanning line 3a partly overlaps in the upper side layer on the gate insulating film 2 as a gate electrode. In the present embodiment, the semiconductor layer 1a is bent into a U shape and has a twin gate structure in which a gate electrode is formed at two portions in a channel direction of the semiconductor layer 1a.

An interlayer insulating film 4, which is formed of a silicon oxide film, silicon nitride film, or a laminated film of them, is formed in the upper side layer on the gate electrode (scanning line 3a). The data line 5a is formed on the surface of the interlayer insulating film 4. The data line 5a is electrically connected through a contact hole 4a, which is formed in the interlayer insulating film 4, to a source region located at a position closest to the corresponding data line 5a. Moreover, a drain electrode 5b is formed on the surface of the interlayer insulating film 4. The drain electrode 5b is a conductive film that is formed at the same time with the data line 5a. The drain electrode 5b is electrically connected to the drain region 1d through a contact hole 4b, which is formed in the interlayer insulating film 4.

An interlayer insulating film 6, which serves as a photosensitive resin layer, is formed in the upper side layer on the data line 5a and on the drain electrode 5b. In the present embodiment, the interlayer insulating film 6 is formed of a thick photosensitive resin having a thickness of 1.5 μm to 2.0 μm.

The common electrode 9a, which is a lower layer side electrode layer, is formed of a solid ITO film over the entire surface of the interlayer insulating film 6. An interelectrode insulating film 8 is formed on the surface of the common electrode 9a. In the present embodiment, the interelectrode insulating film 8 is formed of a silicon oxide film or a silicon nitride film having a thickness of 400 nm or below. The pixel electrodes 7a, which serve as an upper layer side electrode layer, are formed of ITO film in the upper side layer on the interelectrode insulating film 8. An alignment layer 16 is formed on the surface side of the pixel electrodes 7a. The above described slit-like openings 7b are formed in each of the pixel electrodes 7a. In the above described configuration, the common electrode 9a and the pixel electrodes 7a are opposite each other through the interelectrode insulating film 8, and the holding capacitance 60 is formed using the interelectrode insulating film 8 as a dielectric film. In the present embodiment, the pixel electrode 7a is electrically connected to the drain electrode 6b through a contact hole 6a, which is formed in the interlayer insulating film 6. For this reason, the common electrode 9a has a rectangular cutout 9d, which is located at a portion at which the contact hole 6a is formed. Note that the alignment layer 16 is formed on the surface side of the pixel electrode 7a. In the above configured element substrate 10, the liquid crystal layer 50 is driven at the slit-like openings 7b and therearound by using a horizontal electric field formed between the pixel electrodes 7a and the common electrode 9a.

In the opposite substrate 20, a light shielding layer 23b is formed on an inner surface of the translucent substrate 20b (a surface on the side adjacent to the liquid crystal layer 50) so that the light shielding layer 23b is opposite the pixel boundary areas 10e, 10f. In areas surrounded by the light shielding layer 23b, color filters 22 corresponding to respective colors are formed. The light shielding layer 23b and the color filters 22 are covered with an insulating protection film 24. An alignment layer 26 is formed on the surface side of the insulating protection film 24.

Detailed Configuration of Each Pixel

The liquid crystal display device 100 according to the present embodiment is of a transflective type. Each of the plurality of pixels 100a includes the transmissive display area 100t that displays an image in a transmission mode and the reflective display area 100r that displays an image in a reflection mode. For this reason, the interlayer insulating film 6 is formed of a photosensitive resin that has an uneven portion 6c located at a position corresponding to the reflective display area 100r, and also serves as a planarizing film for the transmissive display area loot and an area in which the thin-film transistor 30 is formed. The uneven portion 6c of the interlayer insulating film 6 may be, for example, formed, after a photosensitive resin is half exposed and developed, by flowing the photosensitive resin when being baked. Alternatively, by applying an additional photosensitive resin layer in the upper side layer on a photosensitive resin that is exposed and developed corresponding to an uneven portion, it is also possible to form a photosensitive resin layer (interlayer insulating film 6) that is provided with the uneven portion 6c.

Of the upper layers formed on the interlayer insulating film 6, a light reflection layer 11a, which is formed of aluminum, silver, alloy of them, or the like, is formed in the reflective display area 100r, and the common electrode 9a, the interelectrode insulating film 8 and the pixel electrode 7a are formed in the upper side layer on the light reflection layer 11a. Here, the uneven portion 6c of the interlayer insulating film 6 is provided for the light reflection layer 11a and is thereby given a light scattering characteristic.

In the above configured liquid crystal display device 100, backlight emitted from a backlight device (not shown) is optically modulated by the liquid crystal layer 50 when it passes through the transmissive display area 100t and exits from the side of the opposite substrate 20 as display light. In addition, outside light that enters the reflective display area 100r from the side of the opposite substrate 20 is optically modulated by the liquid crystal layer 50 and exits as display light when it is reflected on the light reflection layer 11a and exits from the side of the opposite substrate 20 as display light. Thus, the length of path, along which light travels, is different between the transmission mode and the reflection mode.

Then, in the present embodiment, on a surface on which the inner surface of the opposite substrate 20 (liquid crystal layer 50) is located, a retardation layer 27, which is formed of liquid crystal polymer, is formed on the surface of the insulating protection film 24 in the reflective display area 100r, and the alignment layer 26 is formed on the surface side of the retardation layer 27. Thus, even when the length of path, along which light travels, is different between the transmission mode and the reflection mode, it is possible to match both retardations. Here, the retardation layer 27 is formed by applying liquid crystal polymer, or the like, and the end portions 27b and 27c are formed to be a wide tapered portion 27a having a width of approximately 8 μm. Light transmitted through the tapered portion 27a exits without appropriate modulation, so that it decreases display quality.

In the present embodiment, when the reflective display areas 100r (retardation layers 27) are provided, as shown by the upward oblique area in FIG. 3 and FIG. 4B, of the pixel boundary areas 10f that extend in one direction (the direction in which the scanning lines 3a extend), the reflective display areas 100r (retardation layers 27) are set in a stripe along the one direction so as to extend over the adjacent pixels 100a arranged on both sides of the alternate pixel boundary areas 10f arranged in another direction that intersects with the one direction (the direction in which the data lines 5a extend). That is, the reflective display areas 100r (retardation layers 27) are formed so that, of the plurality of scanning lines 3a, the reflective display areas 100r extend over the adjacent pixels 100a arranged on both sides of the alternate scanning lines 3a and extend in a stripe along the scanning lines 3a. As a result, each pixel 100a has only one end portion 27b or 27c (tapered portion 27a), in the width direction, of the retardation layer 27.

Each of the end portions 27b and 27c, in the width direction, of the retardation layers 27 overlaps the light shielding area 23a, illustrated in FIG. 1, in plan view. Although not shown in the drawing, a black resin is pasted along each of the end portions 27b and 27c, in the width direction, of the retardation layers 27. The black resin is formed to extend partly onto the even portion of the retardation layers 27 over the tapered portions 27a so that the tapered portions 27a are entirely covered with the black resin. In addition, the black resin is formed not to protrude from the light shielding area 23a as viewed in plan.

Moreover, the end portions 27d (tapered portions 27a), in the longitudinal direction, of the retardation layers 27 (one direction or the direction in which the scanning lines 3a extend) are located outside the image display area 10a and, further, located in an outer area of the pixel array area 10b beyond the dummy pixel area 10x. Thus, because no end portions 27d, in the longitudinal direction, of the retardation layers 27 are located on the pixels 100a arranged at the end portions of the image display area 10a, each of the pixels 100a arranged at the end portions, as well as the other pixels 100a, has only one end portion 27b or 27c (tapered portion 27a), in the width direction, of the retardation layer 27.

Advantageous Effects of the Present Embodiment

As described above, in the liquid crystal display device 100 according to the present embodiment, of the pixel boundary areas 10f that extend in one direction (the direction in which the scanning lines 3a extend), the reflective display areas 100r (retardation layers 27) are set in a stripe along the one direction so as to extend over the adjacent pixels 100a arranged on both sides of the alternate pixel boundary areas 10f, which are arranged in another direction that intersects with the one direction (the direction in which the data lines 5a extend). As a result, each pixel 100a has only one end portion 27b or 27c (tapered portion 27a), in the width direction, of the retardation layer 27. Moreover, because the end portions 27d (tapered portions 27a), in the longitudinal direction, of the retardation layers 27 (one direction or the direction in which the scanning lines 3a extend) are located outside the image display area 10a and, further, located in an outer area of the pixel array area 10b beyond the dummy pixel area 10x, each of the pixels 100a arranged at the end portions of the image display area 10a has only one end portion 27b or 27c (tapered portion 27a), in the width direction, of the retardation layer 27. Therefore, in any one of the pixels 100a, a minimum number of the end portions 27b, 27c, 27d (tapered portions 27a) of the retardation layers 27 are present. Even when an image is displayed in the reflection mode, it is possible to display an image with a sufficient quantity of light and, in addition, it is possible to display a high-contrast image, thus improving the quality of image displayed.

Other Embodiments

In the above described embodiment, the invention is applied to the FFS mode liquid crystal display device 100 as a type that uses a horizontal electric field; however, the invention is applicable to any liquid crystal devices in which a retardation layer is formed on an inner surface of the liquid crystal device. For example, the invention may be applied to an IPS mode liquid crystal display device in which pixel electrodes and a common electrode are formed into a comb shape in the element substrate or may be applied to another liquid crystal device, such as a TN mode, a homeotropic alignment mode, or an OCB mode. Furthermore, the invention may also be applied to a liquid crystal display device in which the retardation layers 27 are formed on the side of the element substrate 10.

In addition, a polysilicon film is used as a semiconductor layer in the present embodiment; however, the invention may be applied to the element substrate 10 that uses an amorphous silicon film or a monocrystal silicon layer. Moreover, the invention may also be applied to a liquid crystal display device that uses a thin-film diode element (nonlinear element) as a pixel switching element.

Further, in the present embodiment, the end portions, in the longitudinal direction, of the retardation layers are located outside the dummy pixel area; however, it is also applicable that, without providing dummy pixels, retardation layer end portions are located outside the image display area or retardation layer end portions are located on the dummy pixels.

Application Example to Electronic Apparatus

Figure 5A:
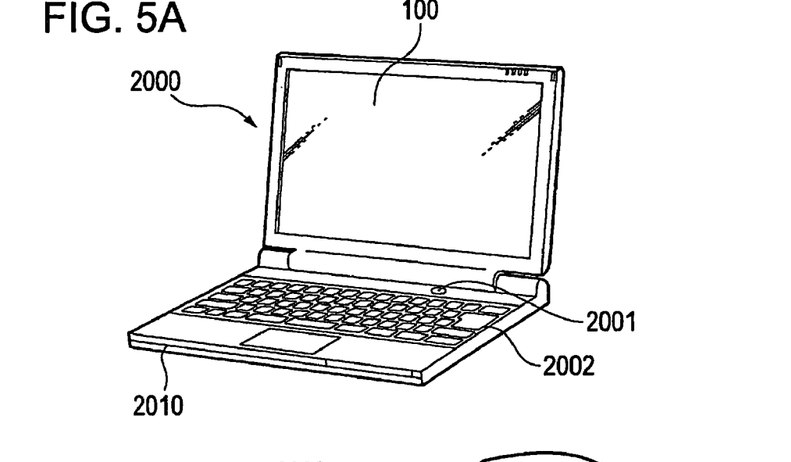
FIG. 5A to FIG. 5C are views illustrating electronic apparatuses that use the liquid crystal display device according to the embodiment of the invention.
Figure 5B:
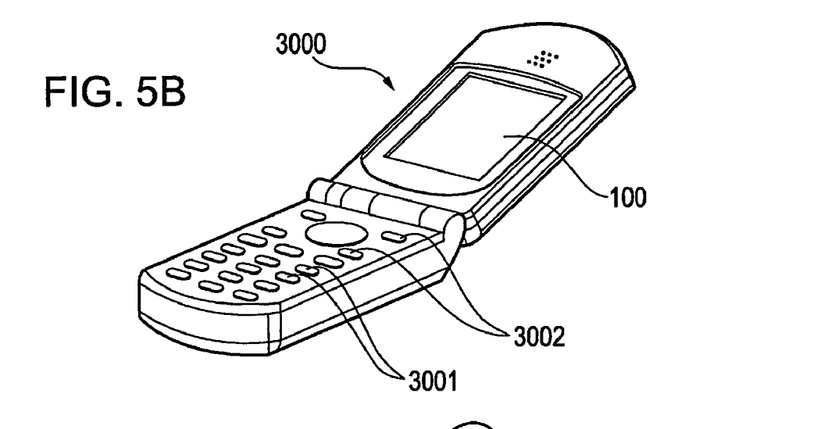
Figure 5C:
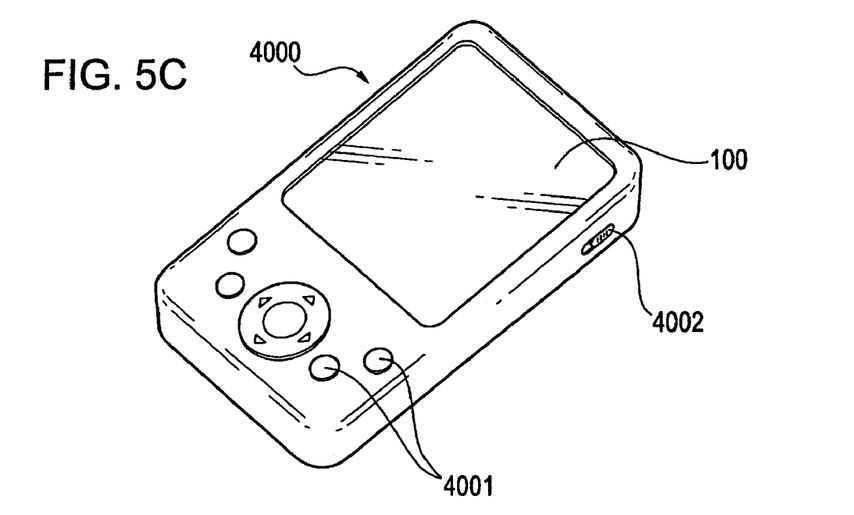

An electronic apparatus to which the above described liquid crystal display device 100 is applied will now be described. FIG. 5A is a view that shows a configuration of a mobile personal computer provided with the liquid crystal display device 100. The personal computer 2000 includes the liquid crystal display device 100, which serves as a display unit, and a main body portion 2010. The main body portion 2010 is provided with a power switch 2001 and a keyboard 2002. FIG. 5B is a view that shows a configuration of a mobile telephone that is provided with the liquid crystal display device 100. The mobile telephone 3000 includes a plurality of operation buttons 3001, a plurality of scroll buttons 3002, and the liquid crystal display device 100, which serves as a display unit. By manipulating the scroll buttons 3002, an image displayed on the liquid crystal display device 100 is scrolled. FIG. 5C is a view that shows a configuration of a personal digital assistant (PDA) that uses the liquid crystal display device 100. The portable information terminal 4000 includes a plurality of operation buttons 4001, a power switch 4002, and the liquid crystal display device 100, which serves as a display unit. As the power switch 4002 is manipulated, various pieces of information, such as an address book and a schedule book, are displayed on the liquid crystal display device 100.

Note that the electronic apparatuses that uses the liquid crystal display device 100 include, in addition to the apparatuses shown in FIG. 5A to FIG. 5C, a digital still camera, a liquid crystal display television, a viewfinder type or a direct view type video tape recorder, a car navigation system, a pager, a personal organizer, an electronic calculator, a word processor, a workstation, a video telephone, a point-of-sales terminal, and devices provided with a touch panel display. Then, as a display portion for these various electronic apparatuses, the above described liquid crystal display device 100 may be applied.

The entire disclosure of Japanese patent application Nos: 2007-083648 filed Mar. 28, 2007 and 2007-212630 filed Aug. 17, 2007 are expressly incorporated by reference herein.

What is claimed is:

1. A liquid crystal device, in which a liquid crystal layer is held between a pair of substrates, comprising:
a plurality of pixels, each of which includes a transmissive display area and a reflective display area; and
a retardation layer that is arranged at a position that at least overlaps the reflective display areas and at an inner side of the pair of substrates, wherein
the retardation layer is formed so as to extend over the reflective display areas of at least two adjacent pixels among the plurality of pixels, wherein
the retardation layer has a first end portion that is located at one of the two adjacent pixels and a second end portion that faces the first end portion and located in the other pixel of the two adjacent pixels, wherein
any one of the first end portion and the second end portion is tapered inside the plurality of pixels, wherein
the retardation layer has a third end portion that intersects with the first end portion and the second end portion, and wherein
the third end portion is located outside the plurality of pixels.

2. The liquid crystal device according to claim 1, wherein the reflective display areas of the two adjacent pixels face each other and the two adjacent pixels are located at both sides of a pixel boundary area that extends in a first direction.

3. The liquid crystal device according to claim 2, wherein the plurality of pixels include a plurality of pixels that are arranged along the first direction, and wherein the retardation layer extends over the plurality of pixels that are arranged along the first direction.

4. The liquid crystal device according to claim 1, wherein the plurality of pixels include display pixels that are arranged in an image display area and dummy pixels that are arranged outside the image display area, and wherein the third end portion is located outside the dummy pixels.

5. The liquid crystal device according to claim 4, further comprising: a light shielding area that overlaps the third end portion.

6. The liquid crystal device according to claim 2, wherein the pixels include pixel electrodes, switching elements that are connected to the corresponding pixel electrodes, and at least one common electrode that is opposite the pixel electrodes, wherein each of the switching elements is connected to a corresponding scanning line and a corresponding signal line, and wherein one of the scanning line and the signal line is formed in the pixel boundary area that extends in the first direction.

7. The liquid crystal device according to claim 6, wherein both the pixel electrodes and the at least one common electrode are formed in one of the pair of substrates.

8. A liquid crystal device, in which a liquid crystal layer is held between a pair of substrates, comprising:
   a plurality of pixels; and
   a retardation layer that is arranged at an inner side of the pair of substrates and at a position that at least overlaps the pixels, wherein
   the retardation layer is arranged so as to extend over the plurality of pixels and has first end portion that is located outside the plurality of pixels and a second end portion that is located inside the plurality of pixels, wherein
   the second end portion is tapered.

9. The liquid crystal device according to claim 8, wherein the plurality of pixels include display pixels that are arranged in an image display area and dummy pixels that are arranged outside the image display area, wherein the end portion is located outside the dummy pixels.

10. The liquid crystal device according to claim 8, further comprising:
    a light shielding layer that overlaps the end portion.

11. The liquid crystal device according to claim 10, wherein the retardation layer has an even portion that is connected to the tapered end portion, and wherein at least part of the light shielding layer is formed on the even portion.

12. The liquid crystal device according to claim 9, wherein the pixels include pixel electrodes, switching elements that are connected to the corresponding pixel electrodes, and at least one common electrode that is opposite the pixel electrodes, and wherein both the pixel electrodes and the at least one common electrode are formed in one of the pair of substrates.

13. An electronic apparatus comprising the liquid crystal device according to claim 1.

* * * * *